(12) United States Patent
Chang

(10) Patent No.: US 7,917,483 B2
(45) Date of Patent: Mar. 29, 2011

(54) SEARCH ENGINE AND METHOD WITH IMPROVED RELEVANCY, SCOPE, AND TIMELINESS

(75) Inventor: William I. Chang, Saratoga, CA (US)

(73) Assignee: Affini, Inc., Saratoga, CA (US)

( * ) Notice: Subject to any disclaimer, the term of this patent is extended or adjusted under 35 U.S.C. 154(b) by 1734 days.

(21) Appl. No.: 10/832,757

(22) Filed: Apr. 26, 2004

(65) Prior Publication Data

US 2005/0004943 A1 Jan. 6, 2005

Related U.S. Application Data

(60) Provisional application No. 60/464,744, filed on Apr. 24, 2003.

(51) Int. Cl.
*G06F 7/00* (2006.01)
(52) U.S. Cl. .......... 707/705; 707/709; 707/E17.107
(58) Field of Classification Search .......... 707/104.1, 707/3–10, 200, 705, 709; 706/45; 345/440; 715/515
See application file for complete search history.

(56) References Cited

U.S. PATENT DOCUMENTS

| | | | | |
|---|---|---|---|---|
| 5,488,725 A * | 1/1996 | Turtle et al. | | 707/5 |
| 5,606,685 A * | 2/1997 | Frandeen | | 711/117 |
| 5,895,551 A * | 4/1999 | Kwon | | 156/345.46 |
| 5,920,859 A * | 7/1999 | Li | | 707/5 |
| 5,953,718 A * | 9/1999 | Wical | | 707/5 |
| 6,018,733 A * | 1/2000 | Kirsch et al. | | 707/3 |
| 6,070,158 A * | 5/2000 | Kirsch et al. | | 707/3 |
| 6,125,361 A * | 9/2000 | Chakrabarti et al. | | 707/3 |
| 6,128,701 A * | 10/2000 | Malcolm et al. | | 711/133 |
| 6,272,598 B1 * | 8/2001 | Arlitt et al. | | 711/133 |
| 6,463,430 B1 * | 10/2002 | Brady et al. | | 1/1 |
| 6,502,081 B1 * | 12/2002 | Wiltshire et al. | | 706/12 |
| 6,542,889 B1 * | 4/2003 | Aggarwal et al. | | 707/5 |
| 6,591,266 B1 * | 7/2003 | Li et al. | | 707/10 |
| 6,638,314 B1 * | 10/2003 | Meyerzon et al. | | 715/513 |
| 6,675,159 B1 * | 1/2004 | Lin et al. | | 707/3 |
| 6,757,646 B2 * | 6/2004 | Marchisio | | 704/8 |
| 6,823,048 B2 * | 11/2004 | Gillespie | | 379/88.19 |
| 6,981,040 B1 * | 12/2005 | Konig et al. | | 709/224 |
| 6,990,628 B1 * | 1/2006 | Palmer et al. | | 715/234 |

(Continued)

OTHER PUBLICATIONS

So et al., Cache Operations by MRU Change, 1988, IEEE, vol. 37, Issue 6, pp. 700-709.*

*Primary Examiner* — Charles Kim
*Assistant Examiner* — Jessica N Le
(74) *Attorney, Agent, or Firm* — Edward C. Kwok; Haynes and Boone, LLP

(57) ABSTRACT

A search engine and a method achieve timeliness of documents returned in a search result by a relevancy feedback mechanism driven by the frequency in which a URL is returned in recent searches. The relevancy feedback mechanism includes one or more random processes which determine whether or not a cached or indexed web page associated with a URL in the search result should be refreshed. In addition, the random processes also determine whether or not hyperlinks in the cached or indexed web page should be followed to access related web pages. Accesses of web pages resulting from the operations of the random processes are used to update any document index maintained by the search engine. Relevancy scoring functions implemented in look-up tables are also disclosed. A more accurate relevancy scoring function is achieved using a lexicon based on anchortexts of extracted hyperlinks of web documents.

16 Claims, 3 Drawing Sheets

U.S. PATENT DOCUMENTS

| | | | |
|---|---|---|---|
| 6,996,676 B2 * | 2/2006 | Megiddo et al. | 711/129 |
| 7,065,743 B2 * | 6/2006 | Blais et al. | 717/108 |
| 7,093,012 B2 * | 8/2006 | Olstad et al. | 709/224 |
| 7,124,127 B2 * | 10/2006 | Sakamoto et al. | 707/3 |
| 7,181,681 B2 * | 2/2007 | Kundu | 715/501.1 |
| 7,299,219 B2 * | 11/2007 | Green et al. | 1/1 |
| 2001/0013035 A1 * | 8/2001 | Cohen | 707/5 |
| 2002/0059219 A1 * | 5/2002 | Neveitt | 707/5 |
| 2002/0087515 A1 * | 7/2002 | Swannack et al. | 707/2 |
| 2002/0116525 A1 * | 8/2002 | Peters et al. | 709/242 |
| 2002/0184448 A1 * | 12/2002 | Cherkasova et al. | 711/133 |
| 2003/0004966 A1 * | 1/2003 | Bolle et al. | 707/104.1 |
| 2003/0061449 A1 * | 3/2003 | Beyda | 711/133 |
| 2003/0135826 A1 * | 7/2003 | Dozier | 715/515 |
| 2003/0167163 A1 * | 9/2003 | Glover et al. | 704/9 |
| 2003/0208482 A1 * | 11/2003 | Kim et al. | 707/3 |
| 2003/0212699 A1 * | 11/2003 | Denesuk et al. | 707/102 |
| 2004/0059736 A1 * | 3/2004 | Willse et al. | 707/100 |
| 2004/0064442 A1 * | 4/2004 | Popovitch | 707/3 |
| 2004/0128346 A1 * | 7/2004 | Melamed et al. | 709/203 |
| 2004/0210826 A1 * | 10/2004 | Najork | 715/501.1 |
| 2005/0022114 A1 * | 1/2005 | Shanahan et al. | 715/513 |
| 2005/0086583 A1 * | 4/2005 | Obata et al. | 715/501.1 |
| 2005/0114666 A1 * | 5/2005 | Sudia | 713/175 |
| 2005/0171932 A1 * | 8/2005 | Nandhra | 707/3 |

* cited by examiner

SEARCH ENGINE AND METHOD WITH IMPROVED RELEVANCY, SCOPE, AND TIMELINESS

CROSS-REFERENCE TO COPENDING PATENT APPLICATIONS

This invention relates to and claims priority to U.S. provisional patent application Ser. No. 60/464,744, entitled "Search Engine with Improved Relevancy, Scope, and Timeliness," filed on Apr. 24, 2003.

BACKGROUND OF THE INVENTION

1. Field of the Invention

The present invention relates to search engine technology. In particular, the present invention relates to search engines and methods for quick retrieval of relevant and timely documents from a wide area network, such as the World Wide Web.

2. Discussion of the Related Art

The search engine is an important enabling application of the internet which allows the user to quickly identify and retrieve information ("web pages") from the World Wide Web (WWW). In fact, the search engine has caused a profound consumer behavioral change: the user now prefers typing his data retrieval criteria into a "search box" to "browsing" or traversing painstakingly and manually cataloged hierarchical directories. Today, more than a hundred million searches are performed every day on the several billion web pages of the WWW. Yet, existing methods remain unsatisfactory in addressing the most basic search problems.

Three desired qualities are fundamental to a search: the relevancy of the search results returned, the extent of the coverage ("scope") over the WWW, and the age ("timeliness") of the information retrieved. As to relevancy, as the index size grows current search engines should aim to achieve ever greater refinement and accuracy on the web pages they find and rank, so that the first few web pages returned to a user would correspond precisely to the information the user is seeking. With respect to scope, even the largest search engines index only a fraction of the WWW at the present time. Nevertheless, most of the web pages that are indexed are never returned as search results to actual queries. Thus, search engines should improve the scope of their indexing, especially automatic indexing, so that a greater portion of the useful content that exists on the WWW can be made available and more efficiently accessed. Also, the largest search engines today are unable to refresh their search indexes quickly enough to return only current information from the WWW. Today, these search engines often return many web pages which content are significantly changed from when they were indexed; at worst, some indexed web pages simply no longer exist (i.e., "dead links").

To improve relevancy, some search engines take a "tiered" approach. Under a tiered approach, a search engine gives greater weight in its indexing to one or more small subsets of the WWW, which are often handcrafted, hierarchical directories that it considers to be of high quality. However, because the web pages in the subsets are manually selected, these web pages often lag in time relative to the rest of the index.

To improve scope, niche "meta-search engines" try to provide an equivalent of a larger search index by combining results from multiple search engines. However, by combining the results of many search engines, these niche meta-search engines erase from the results the effects of the included intelligence or careful tuning of the algorithms in each individual, proprietary search engine. The resulting web pages retrieved are also often ranked in an ad-hoc fashion, resulting in a substantial loss of relevancy.

To improve timeliness, current search engines often identify web pages which content change frequently, and accordingly re-index these web pages more frequently than other web pages. Another approach evaluates a web page's historical change frequency and adaptively accesses the web page at a rate commensurate with the recent change frequency. However, these approaches can manage an index over only a relatively small subset of the WWW, and even then only with limited efficiency. In fact, many changes to a web page (for example, a dynamic time-stamp) may not significantly impact the search results to actual queries. Consequently, much of the WWW "crawling" (i.e., content discovery, also called "spidering") and updating efforts are believed wasted.

Some solutions to these problems are disclosed in U.S. Pat. Nos. 5,701,256 and 6,070,158 relating, respectively, to proteomic sequences search engine and to phrase-based WWW search engine and meta- or distributed search engines.

U.S. Pat. No. 6,070,158 by William Chang provides an example of the construction of a large-scale search engine.

SUMMARY

The present invention provides web-crawling methods that differ from the prior art in fundamental ways. The methods of the present invention index, update, and rank web pages to achieve relevancy, scope, timeliness and efficiency simultaneously. In one embodiment, a relevance ranking method based on a statistical measure of "confidence of relevance" uses term lexicon and training data extracted from hyperlinks in the WWW.

A search engine in which the actual search results (the "hits") are cached, including for example meta- or tiered search engines, is used to drive both content discovery and updating in a probabilistic manner. In a search engine of the present invention, the more often a hit is returned, the more often the web page is refreshed and the hyperlinks within its content are explored.

The present invention is better understood upon consideration of the detailed description below and the accompanying drawings.

DETAILED DESCRIPTION OF THE PREFERRED EMBODIMENTS

Figure 1:
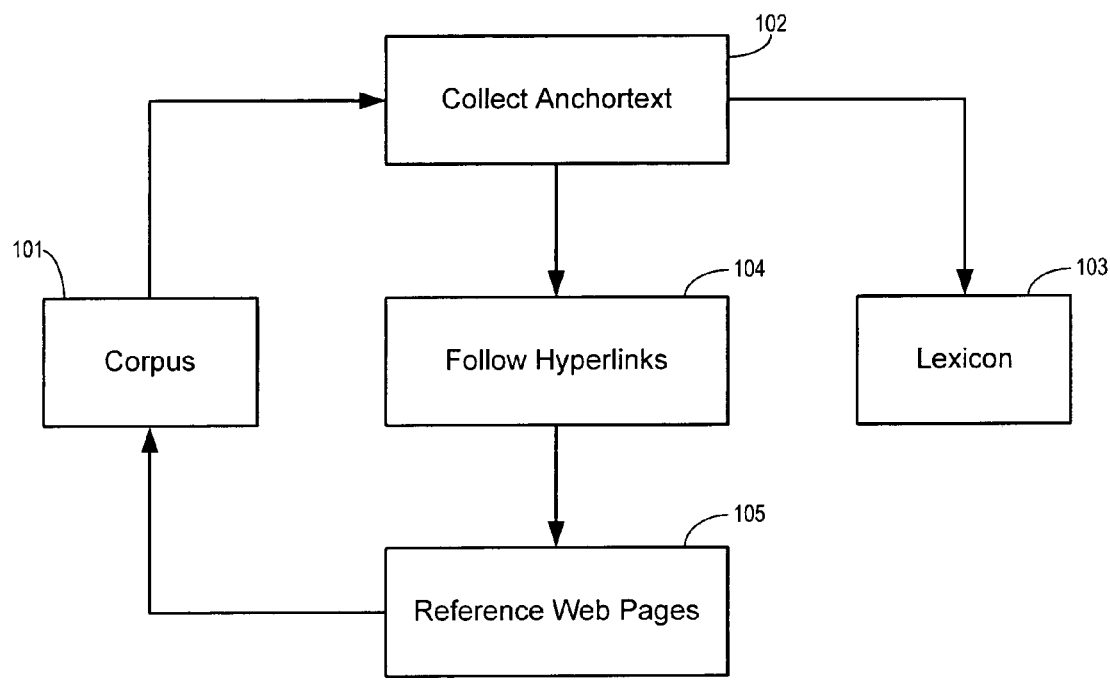
FIG. 1 illustrates a method for constructing a lexicon, in accordance with the present invention.

One embodiment of the present invention provides a method for efficient retrieval of data from the WWW based on constructing a lexicon. To construct a lexicon according to one embodiment, which is illustrated in FIG. 1, one starts with an initial collection of web pages (the "corpus") 101 on one or many subjects (e.g., the entirety or a portion of the Open Directory Project, or a collection of bookmarked URLs[1]). The corpus is parsed at step 102 to extract hyperlinks on these web pages and their associated "anchortexts." After processing to eliminate long or common phrases that should not be indexed, anchortexts are sorted, tallied and "clustered" to create lexicon 103 of "terms". Each term is deemed to represent a unique concept (such as, for example, a proper name of a person or a product). The terms can be words, phrases or collections of words or phrases. To this lexicon, additional terms can be extracted from the corpus for inclusion into the lexicon or introduced from elsewhere. In this context, clustering refers to the grouping of different anchortexts that refer to a common hyperlinked URL. When two anchortexts each occurring a sufficient number of times with the same URL, the anchortexts are deemed "synonyms." In addition, lexical, morphological, or syntactic analysis may be used to further cluster. In one embodiment, clustering is also carried out by "stemming" of verb tenses, noun plurals, variations of spelling and word order. For example, the variants "CDROM", "CD-ROM", "CD ROM", and "cdrom" may be considered different forms of the same term in the lexicon. This lexicon may be further enlarged by including in the corpus one or more next levels of hyperlinked web pages (steps 104 and 105), until the lexicon has become sufficiently rich or stable.

[1] The acronym URL stands for "universal resource locator," which is typically a string used in specifying an object on the internet together with a method of access. The familiar string http://www.yahoo.com, for example, is a URL specifying the hypertext document which is the home page of the domain yahoo.com, to be accessed using the "http" protocol.

Figure 3:
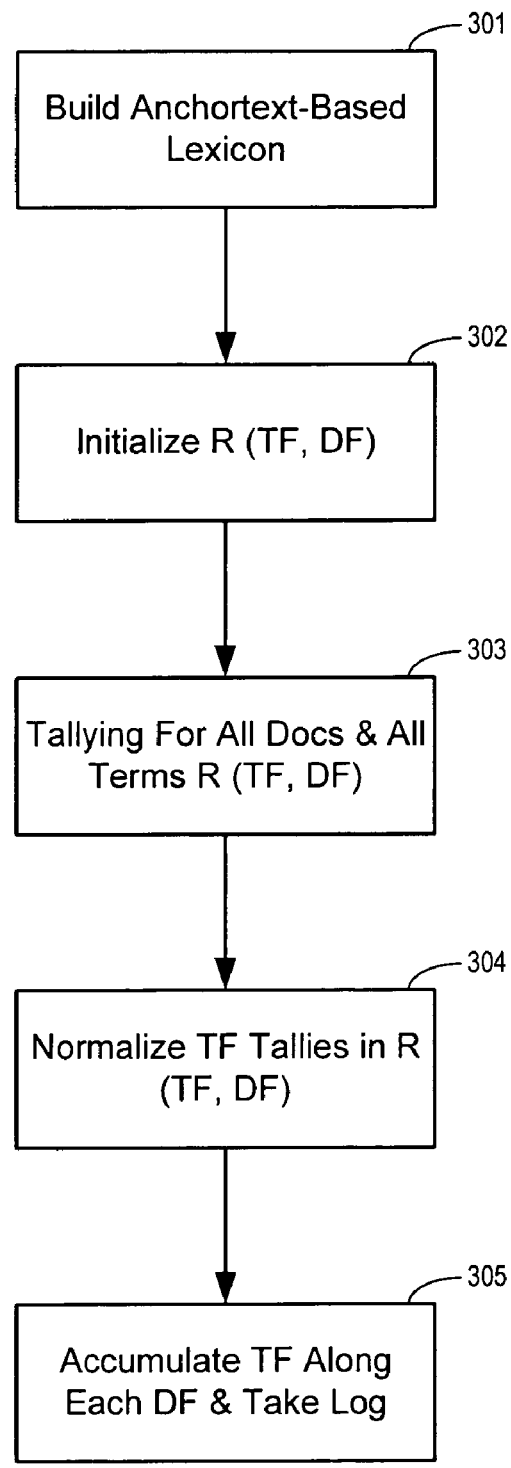
FIG. 3 illustrates an exemplary process for building a relevancy scoring matrix, in accordance with the present invention.

According to another embodiment of the present invention, a method provides a relevancy scoring capability for terms in a lexicon. A "relevancy scoring matrix" R(TF, DF) may be constructed to allow looking up a relevancy score for a document matching a given term, using a document frequency ("DF") and a term frequency ("TF"). In this context, the DF for a term t is a (quantized) percentage of the web pages of the corpus that contain the term t, and the TF of a term t in a given document refers to the number of occurrences—sometimes weighted and normalized—of that term in the document. The relevancy score may be, for example, the product of TF and $DF^2$.[2] FIG. 3 illustrates an exemplary process for building a relevancy scoring matrix, in accordance with the present invention.

[2] Gerard Salton proposes using a scoring function which is the product f(TF) *g(DF), where f and g are some functions of TF and DF, respectively. In practice, this scoring function introduces errors when used to provide a ranking of relevant documents, especially when terms of very different DF are combined in a query. (Intuitively, given a common term and a rare term, their respective TF contributions in the scoring function follow different curves; thus, the function f should not be independent of DF, but should be a function of both TF and DF.)

In one embodiment, matrix R is constructed by first constructing an adequate lexicon, using a method such as the anchortext-based method described above with respect to FIG. 1 (step 301). As discussed above, one first identifies all anchortexts in a selected group of documents of the corpus (e.g., the most recently accessed million documents) as the seed lexicon. The lexicon is then expanded to include anchortexts in the documents referenced by the hyperlinks of the selected group of documents. These referenced documents are then included in the selected group to form an expanded selected group of documents, and the lexicon can be further expanded by following the hyperlinks of this expanded selected group of documents (the "training set"). Of course, the entire corpus may also be used to build the lexicon. This approach that uses anchortexts to seed and expand the lexicon is deemed more reliable than an approach based on a statistical distribution of the terms in the lexicon among documents not known to be relevant.

The relevancy scoring matrix R is then constructed by:
  (1) at step 302, initializing each entry R(TF, DF) in the relevancy scoring matrix R to zero, for all TFs and DFs;
  (2) at step 303, for each term in the lexicon and each document in the corpus that is a priori deemed relevant (e.g., the term occurs as anchortext of hyperlinks referencing said document), tallying (i.e., incrementing by one) the entry of the matrix R(TF, DF) corresponding to the term frequency (TF) and the document frequency (DF);
  (3) at step 304, for each DF, divide each of entry R(i, DF) in the column of matrix R corresponding to DF by the sum of all the entries in the column; and
  (4) at step 305, for each DF, replace each entry R(TF, DF) by the logarithm of the sum of all entries R(i, DF) in the matrix R, where i is an index less than or equal to TF.

The entries of matrix R thus constructed can be each used as a measure of statistical relevance. For example, if the user issues a query Q having terms $t_1, t_2, \ldots t_p$ and if the search returns N documents, a measure of each document's relevancy can be obtained by the sum $$\sum_{s=1}^{p} R(n_s, DF_s),$$

where $n_s$ is the number of times term $t_s$ appears in the document, and $DF_s$ is the fraction of the corpus containing term $t_s$. Other measures of relevancy may, of course, be possible. For example, in addition to tallying over the entire corpus, as in step (2) above, or a selected fraction of the corpus, the tallying can occur over all or a subset of the terms in the lexicon until the matrix R is either sufficiently un-sparse or can be conditioned by smoothing (i.e., local averaging). Additionally or alternatively, a search engine may adopt a priori that the N highest-TF documents for a given term are always deemed relevant, for some fixed N.

In one embodiment, each element of matrix R(TF,DF), referred to as an "odds ratio", is the ratio of the tally of relevant hyperlinks to the tally of non-relevant hyperlinks. In this context, each hyperlink is sampled or exhaustively selected from the training set using the following criteria: (a) the document d referenced by the hyperlink is independently judged for relevance to its anchortext term t, (b) term t has term frequency TF within the referenced document d, and (c) term t has document frequency DF within the corpus or the training set. Such an "odds ratio" measures the "confidence of relevance" that the matching of a term and a document with a given (TF,DF) is due to the document's relevance and not due to random chance. This approach is analogous to that used in proteomic sequence alignment, except that hyperlinks and anchortexts are used instead of conservative amino acid mutations in homologous protein domains (called the "PAM model", and is used in the popular software BLAST) to provide the training data for standardized scoring. The use of hyperlink-derived relevancy training set also allows one to tune on a greater scale any scoring function, either by hand or by computation, to ensure that those documents referenced by hyperlinks with a given term as the anchortext will rank or score high for that term.

In a related embodiment, the documents in a training set is associated with "judgments" that specify whether or not a document d is relevant to a term t. These judgments need not be derived from hyperlink data. In that embodiment, each entry R(TF, DF) of matrix R is the ratio of tallies of relevant to non-relevant judgments relating document d and term t where term t has term frequency TF in document d, and term t has document frequency DF with respect to the corpus.

Given observed term from frequency TF of term t in a document, and document frequency DF of term t with respect to the corpus, the entry R(TF,DF) of matrix R estimates the odds that the document is relevant to term t.

One advantage of a scoring function such as the confidence of relevance function described above, is that the scoring function is computed for an individual term, but a score for multiple terms can nevertheless be achieved statistically rigorously and meaningfully by a combination of their individual scores. The "odds" (or confidence) that a given document d is relevant to multiple terms may be regarded as simply the product of the individual odds. In the embodiment described above, by taking the logarithm of the individual score, the product of the individual odds can be represented by a simple arithmetic sum of the individual logarithmic odds.

Note that the terms in the lexicon need not be single words, but include phrases ("maximal terms") as well. Matching an anchortext by its constituent individual words tends to degrade search engine accuracy. A lexicon that is constructed using maximal term matching provides better performance than a lexicon built from individual words.

When processing a query, the search and scoring are carried out using both the maximal terms and the constituent parts of these maximal terms. The contribution of the constituent parts to the scoring function can be suitably down-weighted to account for "double-counting." Each term in the query is scored against each document returned. (In practice, scoring can be simplified by including in the calculation only the highest scoring documents for each term). For each term, the search engine looks up DF for the term and the TF in each document where the term appears. The values TF and DF are then used to index into matrix R to obtain a relevance or confidence score for the document with respect to that term. The scores of the document with respect to all individual terms in the query are summed to yield the score with respect to the query for that document. The documents are then ranked according to their scores with respect to the query, and the highest scoring documents are returned as hits.

The odds or probability that a web page is relevant for a given term goes up when it is pointed to by a hyperlink in another reliable or "trustworthy" web page and the hyperlink includes the given term in its anchortext. The improvement in odds can be assigned by judging the relevance of randomly sampled hyperlinks having the given term in their anchortexts. Alternatively, a convenient measure can be obtained from a collection of terms each having roughly an equal or similar DF as the given term (i.e. equally common) that are derived from equally reliable or trustworthy web pages. (In general, confidence odds can be assigned for any criterion by applying the criterion to a random sample and then judging its effectiveness; for example, 9 correct results out of 10 applications of the criterion means an odds ratio of 9:1.) In practice, for large classes of terms, this contribution to the "confidence of relevance" by external hyperlinks can be greater than traditional statistically derived scores based on term frequencies. Especially in the context of the WWW, more accurate searches can be achieved when hyperlinks are taken into account.

Using the "confidence of relevance" scoring described above, a method of the present invention incorporates in its relevance ranking the benefits of both hyperlink and term frequency approaches, more rigorously than previous methods in the prior art. The consistent scoring function of the present invention (confidence) can be easily modified to incorporate contribution due to additional intrinsic or extrinsic qualities of the web pages in the corpus, so long as these qualities can be quantified in some manner that adds to or subtract from the confidence of relevance score. Furthermore, down-stream ranking, such as by a distributed, tiered, or meta-search engine, is more predictable and accurate, due to the statistical consistency of confidence score as an odds ratio.

Figure 2:
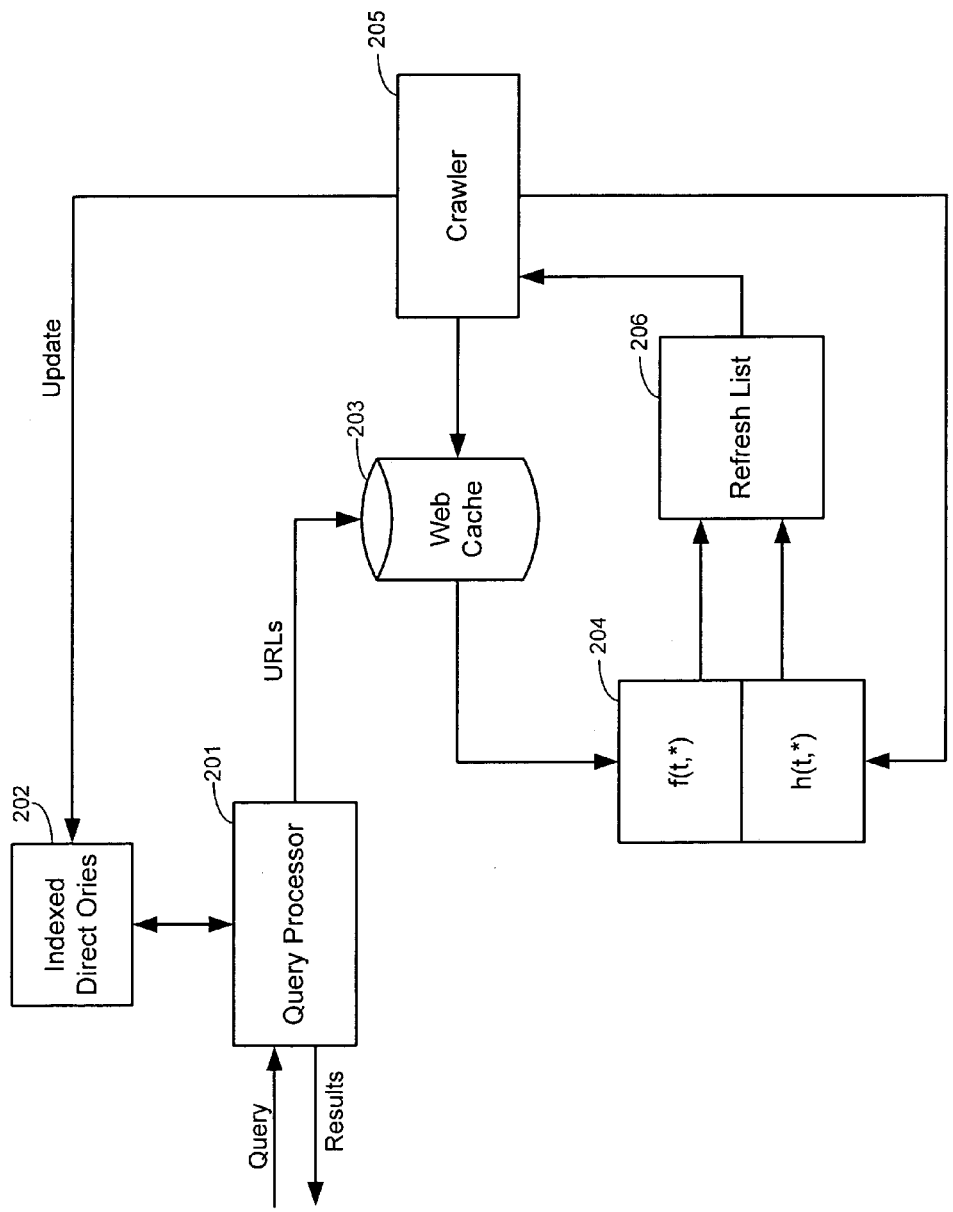
FIG. 2 illustrates an adaptive relevancy feedback mechanism which ensures both timeliness and improved scope in search results, in accordance with one embodiment of the present invention.

According to one embodiment of the present invention, an adaptive "relevancy feedback" mechanism provides search results that are more timely (i.e., consistent with current content or of current interest). FIG. 2 illustrates such an adaptive relevancy feedback mechanism, in accordance with one embodiment of the present invention. As shown in FIG. 2, when a user issues a query, query engine 201 processes the query using search resources such as indices 202 and returns search results to the user. The URLs and the web pages (in whole or in part; for example, using only the extracted title or summary) pointed to by the URLs in the search results are potentially cached in table 203 of "recently accessed" URLs. Table 203 may be indexed, for example, by URLs. Alternatively, to keep table 203 small, table 203 may be indexed by hash signatures of the URLs. If hash signatures are used, the hash function is selected such that, statistically, only very few key collisions may occur. Table 203 also records for each URL the time of last refresh (i.e., the "age" of the last access to the web page). A replacement process removes aged records from table 203 based on, for example, a determination that the age of each URL record to be removed exceeds a preset time. Alternatively, rather than removing aged records, in some applications or for certain URLs, the URL records determined to have an age exceeding the preset time may be automatically refreshed by accesses to the web pages corresponding to the URLs.

The behaviors of two random processes in probabilistic module 204 are governed by the accesses to records of table 203. First, when a URL in the search results is found in a record of table 203 (i.e., the web page corresponding to the URL is recently crawled or refreshed), the URL will be included in refresh list 206 with a probability $f(t, \ldots)$, where f is a probability function of the first random process that depends on the age t of the URL record in table 203. Other parameters of $f(t, \ldots)$ may include, for example, source parameters (e.g., the identities of the user or the crawler to be used), the type of URL that is to be accessed, index size, and workload. If the web page corresponding to the URL is accessed, the URL will be cached in table 203. Crawler 205 accesses the web pages corresponding to the URLs in list 206. If a URL in the search results is not found in table 203, the URL will be included in refresh list 206 with probability $f(\text{infinity}, \ldots)$. In addition, whenever a web page corresponding to a URL cached in table 203 is accessed, the hyperlinks within the web page are extracted. The second random process includes in refresh list 206 each URL among these hyperlinks with a probability $h(s, t, \ldots)$, where h is a probability function of the second random process, s is the number of hyperlinks on the web page from which the hyperlinks are extracted, and t is the age of each cached URL (or infinity, if the URL is not cached). Probability function $h(s, t, \ldots)$ may include other suitable parameters.

When the content of a web page is found to have changed in an access or is found to be no longer in existence, this information is forwarded to search engine 201 or its associated index processor to update the indices in indices 202.

The above relevancy feedback method can be used in conjunction with any conventional crawl and refresh mechanisms, such as brute force, user added URLs, and data-mining from such web resources as news, bulletin boards, and weblogs. Table 203 may be used to coordinate several types of crawlers to minimize overlap. A popular web page (i.e., a web page that appears on many search results) is frequently refreshed due to the first random process. Thus, combined with an effective replacement policy, dead links are rarely found in the query results. Even if the web page returned from the refresh operation is the same as that already cached, the amortized cost of refresh is low when compared to the economic value of the frequent accesses to the web page by users of the search engine. Further, the functions f(t, . . . ) can be tuned or throttled to avoid over-refresh. Similarly, probability function h(s, t, . . . ) of the second random process favors accesses to hyperlinks found on a popular web page. Consequently, the second random process is a cost-effective content discovery mechanism.

According to the methods of the present invention, given an ideal index of all documents, obscure web pages are unlikely to be found in actual query results and thus are allocated less resources. Because resources are more efficiently utilized, query engine 201 can perform indexing and querying over a greater and more useful scope. A method of the present invention is especially well-suited to building a tiered search engine, and can quickly transform a meta-search engine into an effective tiered one, by utilizing a table 203 of cached URLs as the basis of a preferred subset. The "relevance feedback" mechanism described above expands the search scope with additional content referenced by hyperlinks in web pages of initial search results. Accordingly, the present invention simultaneously improves future search relevance, scope, and timeliness cost-effectively.

To determine if a web page has changed from the cached copy, rather than parsing each web page retrieved from the WWW and comparing the newly retrieved web page against the cached copy, a signature of the web page can be computed and cached for the web page. When the signatures of the retrieved web page and the cached page are the same, for certain applications or classes of web pages, it may be unnecessary to re-parse the web page or refresh the hyperlinks within the web page. Additionally, the hyperlinks may be saved to facilitate subsequent repeated access under the second random process.

Additional hints, such as the placement of the URL among the search results, or whether or not the title of the web page includes one or more of the search terms in the query, may be used as parameters to the probability functions f(.) and h(.) for better performance. The knowledge that the user actually clicked on a hit (i.e., accesses the corresponding web page), through mechanisms such as cookies, Dynamic HTML, and redirect (possibly in a random sampling), provides additional information that can be used by the search engine to further enhance the probability functions.

If the search engine indexes only a subset of plausible terms for a given web page, the relevance feedback mechanism of the present invention can direct the indexing of additional useful terms extracted from both queries and anchor-text, and improve the overall lexicon.

According to another aspect of the present invention, a user may request the same query be repeated or iterated to take advantage of the relevancy feedback process for improved relevance (i.e., a "Try Harder" button). The search may also be conducted off-line, i.e., one or both the WWW search request and the corresponding search results may possibly be sent through e-mail to allow for additional processing time or iterations (e.g., a query may be specified in the subject line of an e-mail to a search engine address). E-mail may be an especially effective and popular medium for conducting search, since many resources are available to allow an e-mail to be easily sent, received, sorted, saved, and forwarded to others.

The above detailed description is provided to illustrate the specific embodiments of the present invention and is not intended to be limiting. Numerous modifications and variations within the present invention are possible. The present invention is set forth in the following claims.

I claim:

1. A computer implemented method for adaptive feedback ensuring timeliness of a collection of web pages, the method comprising:
   extracting a uniform resource locator (URL) from a search result; and
   determining whether or not a web page corresponding to the URL is present in whole or in part in the collection, wherein:
      when the web page is determined to be present in the collection, downloading and replacing the web page in the collection in accordance with a first probability, wherein the first probability depends on an age of the web page in the collection; and
      when the web page is determined not to be present in the collection, downloading and including the web page in the collection, further includes extracting hyperlinks from the web page corresponding to the URL and downloading the web pages corresponding to the hyperlinks each with a second probability, wherein the second probability depends on the number of hyperlinks in the web page.

2. The method as in claim 1, wherein the web pages are collected in a cache.

3. The method as in claim 1, wherein the web pages are indexed in a document index.

4. The method as in claim 2, wherein the cache incorporates a replacement policy that favors retaining most recently accessed the web pages.

5. The method as in claim 2, wherein the cache is indexed using a hash signature of the URL.

6. The method as in claim 1, wherein the first probability depends on one of more of: source parameters, a type of the URL, an index size and a workload of a web crawler.

7. The method as in claim 1, wherein the second probability further depends on an age of the URL.

8. The method as in claim 3, further comprising updating the document index using information obtained from accessing the web page corresponding to the URL.

9. An adaptive feedback system for ensuring timeliness of a collection of web pages, the system comprising:
   a query processor that extracts a uniform resource locator (URL) from a search result;
   a cache including a process for determining whether or not a web page corresponding to the URL is present in whole or in part in the collection;
   a web crawler coupled to the processor wherein:
      when the web page is determined to be present in the collection, the web crawler downloads and replaces the web page in the collection in accordance with a first probability, wherein the first probability depends on an age of the web page in the collection; and
      when the web page is determined not to be present in the collection, the web crawler downloads and including the web page in the collection,
      wherein the processor extracts hyperlinks from the web page corresponding to the URL and directs the web crawler to download the web pages corresponding to the hyperlinks each with a second probability, wherein the second probability depends on the number of hyperlinks in the web page.

10. The system as in claim 9, wherein the web pages are collected in the cache.

11. The system as in claim 9, wherein the web pages are indexed in a document index.

12. The system as in claim 10, wherein the cache incorporates a replacement policy that favors retaining most recently accessed the web pages.

13. The system as in claim 10, wherein the cache is indexed using a hash signature of the URL.

14. The system as in claim 9, wherein the first probability depends on one of more of: source parameters, a type of the URL, an index size and a workload of a web crawler.

15. The system as in claim 9, wherein the second probability further depends on an age of the URL.

16. The system as in claim 11, wherein the processor updates the document index using information obtained from accessing the web page corresponding to the URL.

* * * * *